May 29, 1928.

W. S. PACA 1,671,739

MEANS FOR PREVENTING BACK DRIFT OF AUTOMOBILES ON GRADES

Filed June 11, 1927 2 Sheets-Sheet 1

INVENTOR
William S. Paca
BY
Charles B. Mann Jr.
ATTORNEY

May 29, 1928.
W. S. PACA
1,671,739
MEANS FOR PREVENTING BACK DRIFT OF AUTOMOBILES ON GRADES
Filed June 11, 1927 2 Sheets-Sheet 2
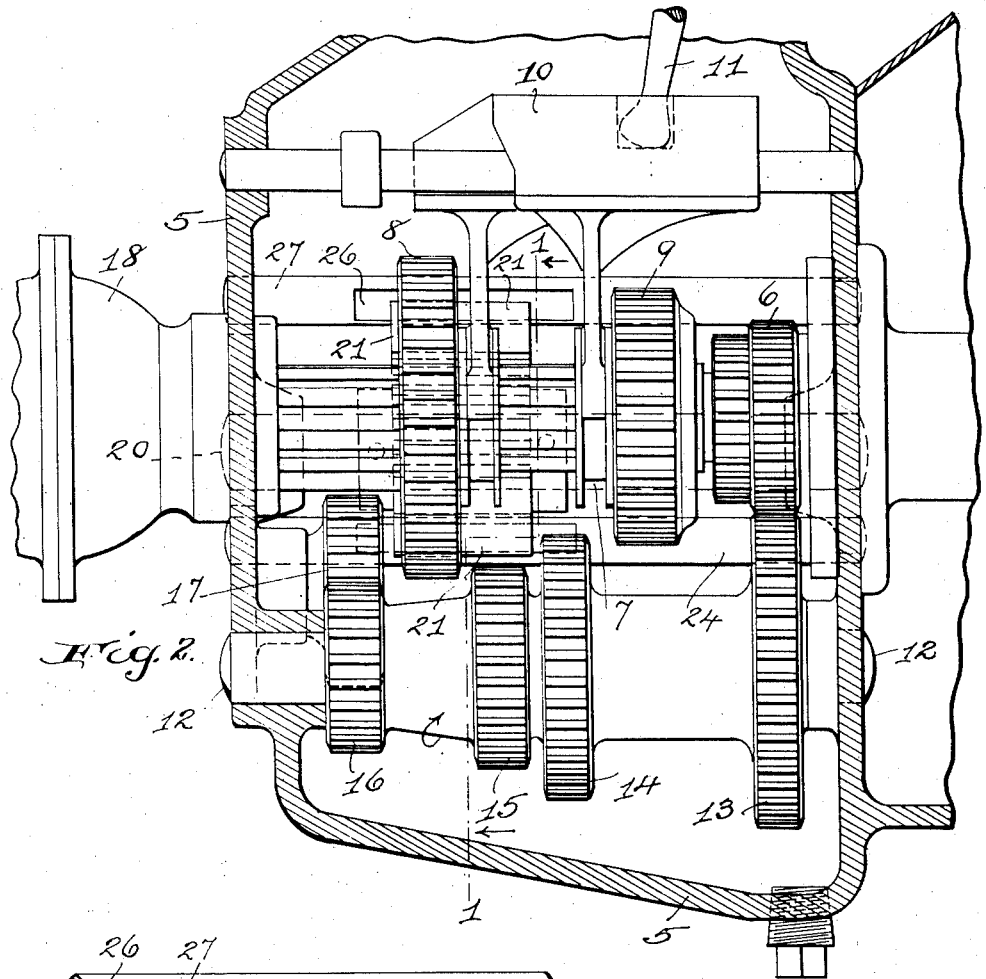
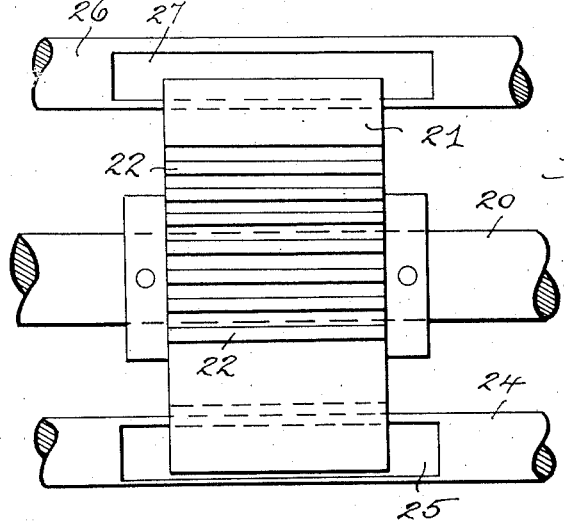
INVENTOR
William S. Paca
BY Charles B. Mann Jr.
ATTORNEY Patented May 29, 1928.

1,671,739

UNITED STATES PATENT OFFICE.

WILLIAM S. PACA, OF OIL CITY, PENNSYLVANIA, ASSIGNOR OF ONE-HALF TO WILLIAM W. PACA.

MEANS FOR PREVENTING BACK DRIFT OF AUTOMOBILES ON GRADES.

Application filed June 11, 1927. Serial No. 198,051.

This invention relates to means for preventing the back drifting of automobiles on grades.

It is a common thing for automobile drivers, even those recognized as experienced drivers, who, after stopping their automobiles on up-grades and making ready to again go ahead, to permit their cars to drift backward slightly as they release their brakes and engage the clutch.

Frequently several cars are in line and quite close together, and the back-drifting of one car will cause it to collide with the next car in the rear, or the driver, in an effort to prevent back-drifting, lets the clutch engage too rapidly in his haste to get his foot on the accelerator to supply gas, will choke the engine and cause confusion and delay in starting up again and repeating the performance.

My invention therefore has for its object to provide an exceedingly simple device to lock the car against back-drifting as long as the control or gear-shift lever is in either the neutral or any forward position.

Of course, with said lever and gears in reverse, rearward movement of the car can take place.

In carrying out my invention, I have found that the same may find expression in a variety of mechanisms, but that it may readily be carried out in connection with the transmission gearing and I have elected to show the same in connection with such gearing.

The preferred embodiment of the invention is therefore shown in the accompanying drawings, wherein,—

Fig. 2, shows a vertical longitudinal section through the gear-case, and

Fig. 3, illustrates the improved device in front view, or as viewed on the line 3—3 of Fig. 1.

Figure 1:
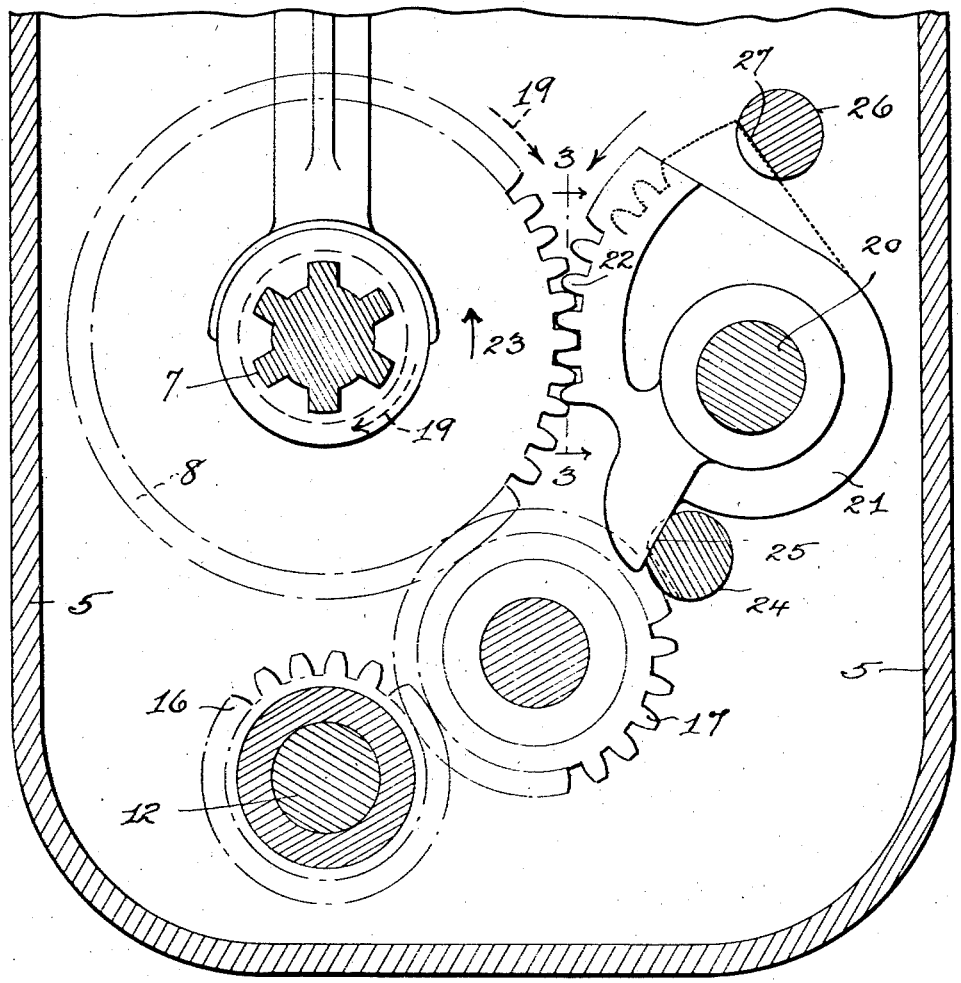
Fig. 1, illustrates a vertical detail through a transmission gear-casing showing the main and counter shafts and gears and the improved device therein.

Referring to the drawing, the numeral 5 designates the gear-casing; 6, the clutch-gear; 7, the main gear shaft; 8 the low and reverse sliding-gear on the main-gear shaft and 9, the high and intermediate sliding-gear on the main-gear shaft.

The sliding low and reverse gear 8 and the sliding high and intermediate gear 9 are both moved on the main gear-shaft 7 by the shifter-fork 10 and control lever 11 in the usual way.

The usual counter-shaft 12 is located below the main shaft and on this counter-shaft, there are the usual gears, consisting of the counter gear 13 which is driven from the clutch-gear 6; the intermediate speed counter-gear 14; the low-speed counter-gear 15, and the reverse counter-gear 16.

In addition to these gears, there is also the usual reverse idler-gear 17.

All of these gears and shafts are of the well-known arrangement, form and operation and are not new with me.

The main shaft 7, extends back to the universal in the housing 18, and from there to the differential at the rear axles as is also well-known to those skilled in the automotive art.

In operation, the low and reverse sliding gear 8, and the high and intermediate sliding-gear 9, are both mounted on the main shaft 7 and while they are free to slide on that shaft, they are locked to that shaft to prevent independent rotation between them and the shaft.

Thus, even with the gears in neutral position as they are shown in Fig. 2 of the drawing, if the automobile drifts backward on an up-grade, the turning of the rear wheels and axles will cause the main-shaft 7 to turn backward, and will therefore cause the low and reverse gear 8 and the high and intermediate gear 9 to also turn backward in the direction indicated by broken-line darts 19 in Fig. 1 of the drawings.

Of course when the gears 8 and 9 are in the neutral position and the clutch is engaged, the gears 6—13—14—15—16 and 17 will all revolve but without effect.

On the other hand, if the gears 8 or 9 are shifted to low, intermediate or high and the clutch is disengaged, those gears will still be free to turn backwardly as the automobile drifts back.

To prevent this back-drift when the gears are either in neutral or any one of the forward speeds is the object of my invention and the means I employ, in the present disclosure for effecting this will now be explained.

In the gear case 5, I provide a rod or bracket 20, on which I pivotally mount a pawl device 21.

In the present instance, this pawl device has the form of a segment, and preferably has a series of teeth 22 on its curved segmental face.

Also in this instance, the rod 20 extends horizontally and lengthwise of the gear casing and is supported in the front and rear walls of the latter while the segmental toothed-pawl is freely mounted on the rod.

This toothed-pawl 21 has a face of a width equal to the combined width of the faces of the gears 8 and 15 or in other words, of sufficient width to engage the gear 8 whether the latter is in the neutral position shown in Fig. 2 or in the shifted position where said gears will engage the low-speed counter-gear 15.

The toothed pawl 21 is therefore pivotally carried on the rod 20 so its toothed surface may engage the teeth of gear 8, no matter whether that gear be in the neutral or the low speed forward position.

When, however, said gear 8 is moved rearwardly on the main shaft 7, so it will be in reverse position at the side of reverse counter gear 17, then said gear 8 will be out of register with said pawl 21 so it may turn unhampered in a reverse direction.

The pawl 21 is weighted or so mounted on rod 20 that it will tend to drop down against the teeth of gear 8 and if the gear is rotating in a forward direction, as indicated by the full line dart 23 in Fig. 1, then the teeth on gear 8 will simply ride past the teeth 22 on the pawl, being cushioned in their riding contact by the heavy oil or grease which is always provided in these gear-cases.

When an automobile is brought to a stop on an up-grade and the clutch disengaged, the pawl 21, will at once drop down with its teeth 22 against the teeth of gear 8, and any tendency of that gear 8 to turn in a backward direction, as would turn if the vehicle began to drift backward, will cause the pawl teeth to engage the gear 8 and lock the latter against back-turning, thus holding the vehicle against back-drifting.

To prevent springing strains on either the rod 20 or the main shaft 7 when the pawl 21 and gear 8 come together, I provide a stop-bar 24 against which the weighted lower end of the pawl may seat,—a flat surface 25, being provided for this purpose.

I also provide another stop-bar 26 with a flat surface 27 above the pawl so that when gear 8 starts rotation in a forward direction, it will kick the pawl 21 up to disengage the teeth but cannot throw the pawl over far enough to prevent its return because of the top stop.

Obviously, the device is exceedingly simple and by locking the gear 8 against backward turning, except when that gear is in reverse, will relieve the driver of an awkward operation of starting on an up-grade without the difficulty of avoiding a back-drifting during the operation.

Having described my invention, I claim,—

1. In an automobile drive mechanism the combination with a transmission mechanism including a main shaft and shiftable gears, of means for moving the gears to place the same in a neutral, reverse or forward speed position and a pawl riding over one of said shiftable gears while the latter is turning in a forward drive position said pawl engaging said gear to prevent backward turning thereof when the gear shift means is in either a neutral or a forward drive position.

2. In an automobile drive mechanism the combination with a transmisison case containing shafts and gearing for effecting a forward or reverse movement, of means for placing the gears in a neutral position, a pawl carried in the casing and riding over one of said gears when the latter is operating in a forward-drive direction and said pawl engaging said gear and locking it against turning in a backward direction when the gears are in a neutral or a forward-drive position.

3. In an automobile drive mechanism the combination with a transmission mechanism including a shaft with shiftable gears thereon, a pivoted segmental toothed pawl whose teeth are arranged on an arch eccentric with respect to the axis of the pawl said toothed pawl being normally held out of operation by the teeth of one of the shiftable gears while the latter is operating in a forward drive direction but dropping into direct engagement with said teeth to prevent back-turning thereof while the same is in either a neutral or any forward speed position.

In testimony whereof I affix my signature.

WILLIAM S. PACA.